(12) United States Patent
Bany et al.

(10) Patent No.: US 7,737,057 B2
(45) Date of Patent: ***Jun. 15, 2010

(54) RELEASE COATING CONTAINING THERMOPLASTIC SILICONE-CONTAINING POLYMER

(75) Inventors: Stephen W. Bany, St. Paul, MN (US); James P. DiZio, St. Paul, MN (US); Patricia J. A. Brandt, Woodbury, MN (US); Janice R. Manore, Roberts, WI (US); Judith A. Green, Coon Rapids, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 27 days.

This patent is subject to a terminal disclaimer.

(21) Appl. No.: 11/981,190

(22) Filed: Oct. 30, 2007

(65) Prior Publication Data

US 2008/0114318 A1 May 15, 2008

Related U.S. Application Data

(62) Division of application No. 10/147,015, filed on May 16, 2002, now Pat. No. 7,524,545.

(51) Int. Cl.
*B32B 27/04* (2006.01)
*B32B 27/12* (2006.01)
*A61F 13/15* (2006.01)
(52) U.S. Cl. .................... 442/108; 442/151; 442/97; 442/99; 604/344; 604/358; 604/389
(58) Field of Classification Search .................... 442/97, 442/99, 108, 151
See application file for complete search history.

(56) References Cited

U.S. PATENT DOCUMENTS

| 3,364,063 A | 1/1968 | Satas |
| 4,237,889 A | 12/1980 | Gobran |
| 4,302,500 A | 11/1981 | Flora |
| 4,728,571 A | 3/1988 | Clemens et al. |

(Continued)

FOREIGN PATENT DOCUMENTS

EP 0 380 236 A2 8/1990

(Continued)

OTHER PUBLICATIONS

ASTM D3811 "Standard Test Method for Unwind Force of Pressure-Sensitive Tapes," *Annual Book of ASTM Standards*, Section 15, vol. 15.09, pp. 432-433 (2002).

(Continued)

*Primary Examiner*—Lynda Salvatore
(74) *Attorney, Agent, or Firm*—Kathleen B. Gross (57) ABSTRACT

An article including: a porous substrate that includes a fibrous material; and a release coating disposed on the fibrous material of the porous substrate; wherein the release coating includes a thermoplastic silicone-containing polymer. A method of making an article, which method includes: providing a porous backing having a first major surface and a second major surface; applying a pressure sensitive adhesive to the first major surface of the porous backing; and applying an aqueous dispersion including a thermoplastic silicone-containing polymer to the second major surface of the porous backing to form a low adhesion backsize.

36 Claims, 3 Drawing Sheets

U.S. PATENT DOCUMENTS

| | | |
|---|---|---|
| 4,737,400 A | 4/1988 | Edison et al. |
| 4,743,242 A | 5/1988 | Grube et al. |
| 4,769,283 A | 9/1988 | Sipinen et al. |
| 4,837,070 A | 6/1989 | Weber et al. |
| 4,871,611 A | 10/1989 | LeBel |
| 4,919,999 A | 4/1990 | Van Soom |
| 4,973,513 A | 11/1990 | Riedel |
| 5,019,071 A | 5/1991 | Bany et al. |
| 5,032,460 A | 7/1991 | Kantner et al. |
| 5,066,289 A | 11/1991 | Polski |
| 5,082,704 A | 1/1992 | Higgins |
| 5,089,336 A | 2/1992 | Kumar et al. |
| 5,128,412 A | 7/1992 | Miyasaka et al. |
| 5,165,976 A | 11/1992 | Newing et al. |
| 5,202,190 A | 4/1993 | Kantner et al. |
| 5,214,119 A | 5/1993 | Leir et al. |
| 5,225,480 A | 7/1993 | Tseng et al. |
| 5,264,281 A | 11/1993 | Arakawa et al. |
| 5,290,615 A | 3/1994 | Tushaus et al. |
| 5,350,631 A | 9/1994 | Tseng et al. |
| 5,356,706 A | 10/1994 | Shores |
| 5,453,319 A | 9/1995 | Gobran |
| 5,461,134 A | 10/1995 | Leir et al. |
| 5,468,237 A | 11/1995 | Miller et al. |
| 5,512,650 A | 4/1996 | Leir et al. |
| 5,516,865 A | 5/1996 | Urquiola |
| 5,543,171 A | 8/1996 | Shores |
| 5,851,205 A * | 12/1998 | Hisada et al. ............... 604/390 |
| 5,990,238 A | 11/1999 | DiZio et al. |
| 6,072,019 A | 6/2000 | Sengupta |
| 6,129,964 A | 10/2000 | Seth |
| 2003/0219591 A1 | 11/2003 | Bany et al. |

FOREIGN PATENT DOCUMENTS

| | | |
|---|---|---|
| EP | 0 380 236 A3 | 8/1990 |
| EP | 0 380 236 B1 | 8/1990 |
| EP | 0 606 532 A1 | 7/1994 |
| EP | 0 606 532 B1 | 7/1994 |
| WO | WO 95/21206 | 8/1995 |
| WO | WO 96/34029 | 10/1996 |
| WO | WO 00/57742 | 10/2000 |

OTHER PUBLICATIONS

Satas, "Ch. 23 Release Coatings," *Handbook of Pressure Sensitive Adhesive Technology*, Second Edition, Donatas Satas, Ed., Van Nostrand Reinhold, New York, Title page and pp. 585-600 (1989).

Jones et al., "Ch. 24 Silicone Release Coatings," *Handbook of Pressure Sensitive Adhesive Technology*, Second Edition, Donatas Satas, Ed., Van Nostrand Reinhold, New York, Title page and pp. 601-626 (1989).

* cited by examiner

RELEASE COATING CONTAINING THERMOPLASTIC SILICONE-CONTAINING POLYMER

This is a division of application Ser. No. 10/147,015, filed 16 May 2002, pending, which is incorporated herein by reference.

BACKGROUND OF THE INVENTION

Normally tacky and pressure sensitive adhesive (PSA) materials have been used for well over half a century. Products of this type, which take the form of tapes, labels, and other types of adhesive coated sheets, must be protected from unintended adhesion to other surfaces. Hence, tapes are typically wound into a roll on their own backing and labels are typically laminated to a release sheet to prevent their accidental adhesion to other surfaces and also to prevent their contamination with air-borne dust and other contaminants.

In order to allow a roll of tape to be unwound without the undesirable transfer of adhesive to the tape baking, it is customary to provide the tape backing with a low adhesion backsize (LAB). Similarly, the release sheet or liner, to which the adhesive coated label is typically laminated, is supplied with a release coating to permit the easy removal of the liner from the label. This LAB or release coating is expected to reproducibly provide an appropriate level of release to the adhesive of interest, to not deleteriously affect the adhesive, and to be resistant to aging so that the release level remains relatively predictable with time.

Various polymers having low critical surface tension such as silicones, fluorine-containing polymers, and long alkyl chain branched polymers are useful as release coatings (e.g., LABs). Long alkyl chain branched polymers are waxy compounds that can be used to prepare release coatings of medium release value which are especially desirable for PSA tapes. Release coating patents also describe the use of silicone polyureas. Suitable silicone polyurea polymers typically include random blocks of polydimethyl siloxane, soft segments of polyethylene oxide or polypropylene oxide, and hard segments of a low molecular weight diamine/diisocyanate product. These can be water-borne or solvent-borne polymers and are typically applied to nonporous films.

There is a need, however, for low adhesion backsize coatings that can be applied to porous backings, such as nonwoven polypropylene backings.

SUMMARY OF THE INVENTION

Many adhesive articles, particularly fastening tapes in the diaper industry, include a porous substrate, typically a porous backing that includes a polymeric film with a fibrous layer disposed thereon. Release coatings are not easily applied to such porous substrates. For example, solvent-borne dispersions of silicone polyurea polymers typically absorb into the porous substrates, which greatly reduces the effectiveness of the release coating. The present invention addresses the problems associated with adhesive articles, particularly fastening tapes, that include a porous substrate, such as a backing that includes a fibrous material.

In one embodiment, the present invention provides an article that includes: a porous substrate including a fibrous material; and a release coating disposed on the fibrous material of the porous substrate. The release coating includes a water-borne thermoplastic silicone-containing polymer that includes at least about 30% silicone segments. As used herein, "water-borne" means a polymer in or deposited from an aqueous dispersion wherein at least 85% of the dispersion's diluting medium is water, the balance being composed of solvent; "thermoplastic" means a polymer that repeatedly can be softened by heating and hardened by cooling through a temperature range characteristic of the polymer without significant molecular degradation taking place, and in the softened state can be shaped by extrusion; and "silicone segments" means diorganosiloxane repeating units of the formula —O—SiR$_2$—.

In another embodiment, the present invention provides an article that includes: a backing having a polymeric film and a fibrous layer disposed thereon; a pressure sensitive adhesive disposed on the polymeric film of the backing; and a low adhesion backsize disposed on the fibrous layer of the backing. The low adhesion backsize includes a thermoplastic silicone-containing polymer. The thermoplastic silicone-containing polymer is a water-borne polymer that includes at least about 30% silicone segments.

In another embodiment, the present invention provides an article that includes: a porous substrate having a fibrous material, wherein the fibrous material includes fibers with greater than 75% of the fibers having a denier of less than 9; and a release coating disposed on the fibrous material of the porous substrate; wherein the release coating includes a thermoplastic silicone-containing polymer that includes at least about 30% silicone segments.

In still another embodiment, the present invention provides an article that includes: a backing having a polymeric film and a fibrous layer disposed thereon; a pressure sensitive adhesive disposed on the polymeric film of the backing; and a low adhesion backsize disposed on the fibrous layer of the backing. The fibrous layer includes fibers wherein greater than 75% of the fibers having a denier of less than 9. The low adhesion backsize includes a thermoplastic silicone-containing polymer.

In another embodiment, the present invention provides an article that includes: a porous substrate having a fibrous material, wherein the fibrous material comprises fibers wherein at least 90% of the fibers having a denier of 5 or less; and a release coating disposed on the fibrous material of the porous substrate; wherein the release coating includes a thermoplastic silicone-containing polymer comprising at least about 30% silicone segments.

In yet another embodiment, the present invention provides an article that includes: a backing having a polymeric film and a fibrous layer disposed thereon; a nonacidic pressure sensitive adhesive disposed on the polymeric film of the backing;

and a low adhesion backsize disposed on the fibrous layer of the backing. The fibrous layer includes fibers wherein at least 90% of the fibers have a denier of 5 or less. The low adhesion backsize includes a thermoplastic silicone polyurea polymer.

The present invention also provides a method of making an article that includes: providing a porous substrate that includes a fibrous material; and applying an aqueous dispersion that includes a thermoplastic silicone-containing polymer to a surface of the porous substrate to form a release coating disposed on the fibrous material of the porous substrate.

In another embodiment, the present invention provides a method of making an article that includes: providing a porous backing having a first major surface and a second major surface; applying a pressure sensitive adhesive to the first major surface of the porous backing; and applying an aqueous dispersion of a thermoplastic silicone-containing polymer to the second major surface of the porous backing to form a low adhesion backsize. Preferably, the porous backing includes a polymeric film and a fibrous layer disposed thereon as described above.

As used herein, "low adhesion backsize" or "LAB" refers to a release coating, preferably a film, that exhibits low adhesion to an adhesive, such as a pressure sensitive adhesive (PSA), so that separation occurs substantially between the adhesive and release coating interface. Release coatings can be used in adhesive tape rolls, where the tape is wound upon itself and usage requires unwinding of the tape roll. Such release coatings are typically referred to as LABs. Release coatings can also be used as a "liner" for other adhesive articles such as labels or medical dressing bandages, where the adhesive article is generally supplied as a sheet-like construction, as opposed to a roll construction.

As used herein, an "aqueous dispersion" of a composition includes within its scope a composition that is dispersible, partially soluble, or readily soluble in water. Thus, a "dispersion" as used herein includes a "solution."

DETAILED DESCRIPTION OF PREFERRED EMBODIMENTS

The present invention provides effective release coatings on porous substrates, particularly porous substrates that include fibrous materials. More particularly, the present invention provides an effective low adhesion backsize on backings that include a polymeric film with a fibrous layer disposed thereon and a pressure sensitive adhesive disposed on the polymeric film of the backing. Such substrates are used in many adhesive articles such as fastening tapes, bandages, labels, etc. The adhesive articles of the present invention are typically fastening tapes used in the diaper industry (i.e., diaper tapes).

In certain embodiments, the present invention provides an LAB on the porous backing opposite the surface on which a PSA is disposed. For example, with a backing that includes a polymeric film and a fibrous layer, the PSA is disposed on the polymeric film and the LAB is disposed on the fibrous layer of the backing. The LAB (or release coating) of the present invention includes a thermoplastic silicone-containing polymer, preferably a silicone polyurea polymer. The following description applies to both release coatings and LABs, which is a specific type of release coating.

Preferably, a major amount (i.e., greater than 50%) of the release coating (e.g., the low adhesion backsize) is located on top of the fibrous material (e.g., the fibrous layer) of the substrate (e.g., the backing). More preferably, the release coating (e.g., LAB) is penetrated into no more than (i.e., no deeper than) the top 20% of the fibrous layer. Herein, the "top" of the fibrous material refers to the fibers in the uppermost region of the substrate.

This can be accomplished typically through the application of the polymer from a water-based system (i.e., a water-borne dispersion). That is, the release coating compositions of the present invention are capable of being dispersed and coated out of water, although they can also be dispersed and coated out of organic solvents or mixtures of organic solvents and water. Although still useful, the same polymers in a solvent-based system (i.e., a solvent-borne dispersion) will typically penetrate further into a porous backing and diminish the effectiveness of the release coating.

Preferably, a release coating (e.g., low adhesion backsize) is disposed on the backing at a coating weight of no greater than 2.0 grams per meter squared ($g/m^2$). More preferably, the coating weight is no greater than about 1.5 $g/m^2$, and most preferred, no greater than about 1.2 $g/m^2$. Typically, the coating weight is sufficient to prevent a high degree of fiber delamination, as described in the Examples Section. Preferably, this means that the coating weight is at least about 0.75 $g/m^2$, and more preferably, at least about 1.0 $g/m^2$.

Significantly, the release coating (e.g., low adhesion backsize) of the present invention provides an adhesive article wherein the bond strength between the polymeric film and the fibrous layer (when such backings are used) is greater than the bond strength between the low adhesion backsize and the pressure sensitive adhesive of an overlying tape. This is evidenced by the Fiber Delamination Test described in the Examples Section where fiber delamination is judged as moderate, slight, or no delamination.

Thermoplastic Silicone-Containing Polymer

Release coatings of the present invention include thermoplastic silicone-containing polymers. Examples of such polymers are described in U.S. Pat. No. 5,214,119 (Brandt et al.), U.S. Pat. No. 5,290,615 (Tushaus et al.), U.S. Pat. No. 5,461,134 (Leir et al.), and U.S. Pat. No. 5,512,650 (Leir et al.), and also European Pat No. 0 380 236 B1 (Leir).

A particular example of a thermoplastic silicone-containing polymer is a solvent-borne silicone polyurea, an example of which is disclosed in U.S. Pat. No. 5,512,650 (Leir et al.).

Another particular example of a thermoplastic silicone-containing polymer is a water-borne or water-dispersible silicone polyurea, an example of which is disclosed in EP Pat. No. 0 380 236 B1 (Leir).

Preferably the silicone-containing polymer includes at least about 30 percent by weight (wt-%) silicone segments, based on the total weight of the polymer. That is, the total weight of the polymer is composed of at least about 30 wt-% —$OSiR_2$— segments. Without prior knowledge of the materials used to make the polymer, the composition of polymer segments can be determined through a combination of analytical techniques, such as mass spectrometry and nuclear magnetic resonance spectroscopy.

For certain solvent-borne and water-borne embodiments, the silicone polyurea is an organopolysiloxane-polyurea block copolymer comprising the following repeating unit (Formula I):

where:

Z is a divalent radical selected from phenylene, alkylene, aralkylene and cycloalkylene;

Y is an alkylene radical of 1 to 10 carbon atoms;

R is at least 50% methyl with the balance of the 100% of all R radicals being selected from a monovalent alkyl radical having from 2 to 12 carbon atoms, a substituted alkyl radical having from 2 to 12 carbon atoms, a vinyl radical, a phenyl radical, and a substituted phenyl radical;

D is selected from hydrogen, an alkyl radical of 1 to 10 carbon atoms, and phenyl;

B is selected from alkylene, aralkylene, cycloalkylene, phenylene, polyethylene oxide, polypropylene oxide, polytetramethylene oxide, polyethylene adipate, polycaprolactone, polybutadiene, mixtures thereof, and a radical which completes a ring structure including A to form a heterocycle, and in the case of the water dispersible forms, contains a sufficient number of in-chain or pendant ammonium ions or pendant carboxylate ions to render the block copolymer water-dispersible (wherein such water-dispersible block copolymers preferably have an ionic content no greater than about 15%);

A is selected from the group consisting of —O—, and where G is selected from the group consisting of hydrogen, an alkyl radical of 1 to 10 carbon atoms, a phenyl group, and a radical which completes a ring structure including B to form a heterocycle;

"n" is a number which is 10 or larger, and

"m" is a number, other than zero, of up to 25.

The above organopolysiloxane-polyurea block copolymers have the conventional excellent physical properties associated with polysiloxanes of low glass transition temperature, high thermal and oxidative stability, UV resistance, low surface energy and hydrophobicity, good electrical properties and high permeability to many gases, and the additional desirable property of having excellent mechanical and elastomeric properties.

The organosiloxane-polyurethane block copolymers are segmented copolymers of the $(AB)_n$ type which can be obtained through a condensation polymerization of a difunctional organopolysiloxane amine (which produces a soft segment) with a diisocyanate (which produces a hard segment) and may include a difunctional chain extender such as a difunctional amine or alcohol, or a mixture thereof.

In the preferred block copolymer Z is selected from hexamethylene, methylene bis-(phenylene), isophorone, tetramethylene, cyclohexylene, and methylene dicyclohexylene and R is methyl.

A method for making the solvent-borne organopolysiloxane-polyurea block copolymer is described in Pat. No. U.S. Pat. No. 5,512,650 (Leir et al.). Briefly, the method includes polymerizing a silicone diamine with at least one diisocyanate optionally in the presence of up to 95 weight percent chain extender under an inert atmosphere in an organic solvent.

A method of making the water-borne organopolysiloxane-polyurea block copolymer is described in EP Pat. No. 0 380 236 B1 (Leir). Briefly, the method includes polymerizing a silicone diamine with at least one diisocyanate optionally in the presence of up to 95 weight percent chain extender under an inert atmosphere in a water soluble solvent that has a boiling point of less than 100° C.

The water-borne organopolysiloxane-polyurea block copolymer described in the present invention is composed from the same segments as those described in EP Pat. No. 0 380 236 B1 (Leir). However, the present invention includes an additional method to make the polymer. This additional method is specific for instances when diamino acids are included in the polymer. Briefly, the additional method includes first making an isocyanate end capped solution of oligomers by allowing a silicone diamine and optional chain extenders to react with at least one diisocyanate under an inert atmosphere in a water soluble solvent that has a boiling point of less than 100° C. An aqueous solution of a neutralized diamino acid chain extender is then allowed to react with the oligomeric mix, thus completing the polymer. Solvent is then distilled from the dispersion, yielding substantially water as the dispersing medium.

The silicone diamine preferably has the following general formula (Formula II):

where R, Y, D, and n are as defined in Formula I above. The diisocyanate preferably has a molecular structure represented by OCN-Z-NCO (Formula III) where Z is as defined in Formula I above.

The molar ratio of diamine to diisocyanate is typically maintained in a range of from about 1:0.95 to about 1:1.05. The chain extender is typically selected from diamines, dihydroxy compounds, and mixtures thereof. When considering water-borne forms of the organopolysiloxane-polyurea block copolymer, at least one of said chain extenders contains at least one group selected from in-chain or pendant amines, and pendant carboxylic acid groups, the number of said groups being selected such that, once ionized, said block copolymer preferably having an ionic content of up to about 15%; and ionizing said organopolysiloxane-polyurea block copolymer. Typical diamino acid chain extenders useful for the water-borne organopolysiloxane-polyurea block copolymer are 2,5-diaminopentanoic acid, 2,6-diaminopentanoic acid, or diaminobenzoic acid. At least about 0.5% by weight of carboxylate anion is desired for obtaining a stable dispersion in certain embodiments, with 1-5% being preferred in certain embodiments.

The diisocyanate useful in the reaction can be a phenylene diisocyanate such as toluene diisocyanate or p-phenylene diisocyanate, hexamethylene diisocyanate, aralkylene diisocyanate such as methylene bis-(phenylisocyanate) or tetramethylxylene diisocyanate, or a cycloalkylene diisocyanate such as isophorone diisocyanate, methylene bis(cyclohexyl) diisocyanate, or cyclohexyl diisocyanate.

A method of making the organopolysiloxane diamine represented by Formula II is also described in EP Pat. No. 0 380 236 B1 and U.S. Pat. No. 5,512,650.

The water-dispersible (i.e., water-borne) polymers described in EP Pat. No. 0 380 236 B1 including the process modifications of the present invention use water soluble solvents having lower boiling points than water. Suitable solvents include 2-butanone, tetrahydrofuran, isopropyl alcohol, or mixtures thereof. The acid-containing silicone block copolymer is ionized in solution by deprotonation with stoichiometric amounts of amine or alkaline earth bases such as sodium hydroxide or triethylamine. If desired for a particular application, the amine-containing or carboxylic acid group-containing polymer can be utilized in un-ionized form and coated from solvent.

Optional Additives

Other compounds, or additives, may be added to release coating compositions including the solvent-borne or water-borne thermoplastic silicone-containing polymer according to the invention to enhance or obtain particular properties. Suitable optional additives are those that preferably do not interfere with the film forming and release properties of a release coating composition according to the invention. Optional additives are preferably selected from the group of a crosslinker; a defoamer; a flow and leveling agent; a colorant (e.g., a dye or a pigment); an adhesion promoter for use with certain substrates; a plasticizer, a thixotropic agent; a rheology modifier; a biocide/anti-fungal agent; a corrosion inhibitor; an antioxidant; a photostabilizer (UV absorber); a surfactant/emulsifier; an extender (e.g., polymer or polymeric emulsion, thickener, filler); and in the particular case of water-bornes, a film former (e.g., a coalescing organic solvent to assist in film formation); and mixtures thereof.

Particularly useful optional additives from the group of extenders include thickeners that can be added to a release coating composition of the present invention and can be present in an amount that does not significantly adversely affect release properties of a release coating so formed. Increase in dispersion viscosity is generally a function of thickener concentration, degree of polymerization, and chemical composition. Examples of suitable commercially available thickeners for water-bornes, referred to by their trade designation, are ACRYSOL 6038A from Rohm & Haas, Philidelphia, Pa., and POLYPHOBE 101 from Dow Chemical, and RHEOLATE 420 from Elementis, Heightstown, N.J. An example of a suitable commercially available thickener for solvent-bornes is polyacrylic acid from Aldrich Chemical.

Other useful optional water-borne additives from the group of extenders can be in the form of polymeric emulsions. An example of a suitable commercially available polymer emulsion includes a vinyl acetate/ethylene copolymer emulsion from Air Products, Inc., Allentown, Pa.

The water-borne polymer of the present invention can be coated out of an organic solvent, water, or mixtures thereof (i.e., a carrier solvent); however, for advantageous results, it is coated out of water. Coating out of water is typically important for providing an article wherein the release coating is primarily on top of the backing as discussed above. Furthermore, release coating compositions provided as aqueous dispersions of the polymer, besides being economical, reduce many problems ordinarily associated with organic solutions and dispersions such as adverse effects of the organic solvent on the surface to be coated, odor, and other environmental concerns during manufacturing.

The desired concentration of the polymer in a release coating composition depends upon the method of coating, upon the desired final coating thickness, and upon the porosity of the substrate. Typically, a release coating composition of the present invention is coated at about 5% to about 50% solids, and optionally at about 10% to about 30% solids.

A release coating composition may be applied to a suitable substrate by means of conventional coating techniques such as wire-wound rod, direct gravure, offset gravure, reverse roll, air-knife, and trailing blade coating. The coating can be dried at room temperature, at an elevated temperature, or a combination thereof, provided that the backing material can withstand the elevated temperature. Typically, the elevated temperature is about 60° C. to about 130° C.

Substrates and Release Coated Materials

Figure 1:
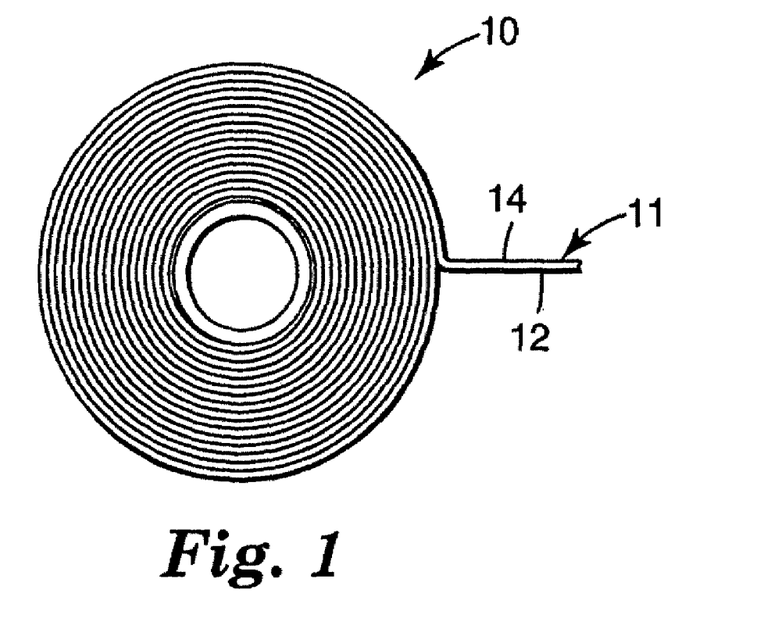
FIG. 1 is a schematic representation of a side view of an adhesive article in a roll construction according to the invention.
Figure 2:
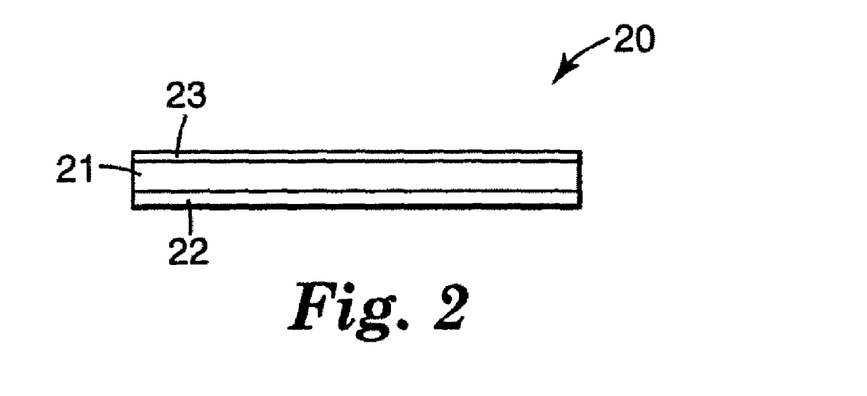
FIG. 2 is an enlarged cross-sectional view of an adhesive article in accordance with the invention.

A release coating of the present invention can be used in a variety of formats such as low adhesion backsize (LAB) for pressure-sensitive adhesive (PSA) tapes. For example, as shown in FIG. 1, a roll of tape 10 includes a flexible backing 11, a pressure sensitive adhesive coating on one major surface 12 (i.e., a first major surface) of the backing and a release coating on the opposite major surface 14 (i.e., a second major surface) of the backing. The release coating is formed from the composition described above. The tape is wound into a roll such that the pressure sensitive adhesive releasably contacts the release coating. FIG. 2 is an exploded cross-section of a segment of the tape 10 (FIG. 1). Referring now to FIG. 2, the tape 20 includes the backing 21, a pressure sensitive adhesive 22, and a release coating (or LAB) 23. The LAB 23 results in a lower specific adhesion toward the pressure sensitive adhesive than does the surface of the backing on which the pressure sensitive adhesive is coated. This permits unwinding of the tape from a roll without offsetting or transfer of the pressure sensitive adhesive from the backing. Another format is a transfer tape including a film of a pressure sensitive adhesive between two release liners, at least one being coated with the release coating composition described above.

A composition of the present invention can be generally used as a release coating for a porous substrate, which may be a sheet, a fiber, or a shaped object. One preferred type of substrate is that which is used for pressure sensitive adhesive articles, such as tapes, labels, bandages, and the like. The composition may be applied to at least one major surface of suitable flexible or inflexible backing materials before drying is initiated.

Particularly preferred articles including a release coating (or LAB) of the invention are tapes, labels, wound dressings, diaper tapes, and medical grade tapes. For example, one preferred article is a diaper tape that includes a polymeric film with a fibrous layer disposed thereon, such that the tape is thin, flexible, supple, and conformable. Thus, preferably, the backings are soft, pliable, conformable, and tough. Typically, such backings are strong enough so they don't readily tear when pulled yet soft and flexible enough to be useful in diaper tapes such that they are not uncomfortable to the wearer.

Preferred substrates exhibit a desired combination of properties such as moisture vapor transmission, softness, conformability, yield modulus, texture, appearance, processability, and strength. The particular combination of properties is typically determined by the desired application. For example, for many uses, the fabric will have a low yield modulus and will be of sufficient strength for the desired application and for dispensation in a roll or pad form.

Woven, nonwoven, or knitted materials are typically used in the porous substrates. Useful flexible substrates include woven fabrics formed of threads of synthetic fibers or natural materials such as cotton or blends of these. Alternatively, substrates may be nonwoven fabrics such as carded, spun-bonded, spun-laced, air-laid, and stitch-bonded fabrics of synthetic or natural fibers or blends of these.

Preferably, a porous substrate includes a fibrous layer that includes hydrophobic fibers. In certain embodiments the fibers are prepared from a material selected from the group consisting of polypropylene, polyethylene, polyester, nylon, and combinations thereof. The fibrous layer is typically disposed on and bonded to a polymeric film. The polymeric film is typically prepared from polypropylene, polyethylene or polypropylene/polyethylene copolymers.

Preferably, the fibrous material includes greater than 75%, and more preferably, at least 90%, of the fibers having a denier of less than 9, preferably, of 5 or less, more preferably, of 3 or less, and most preferably, of 2 or less. Denier is defined as the weight in grams of a 9000 meter length of fiber.

Figure 6:
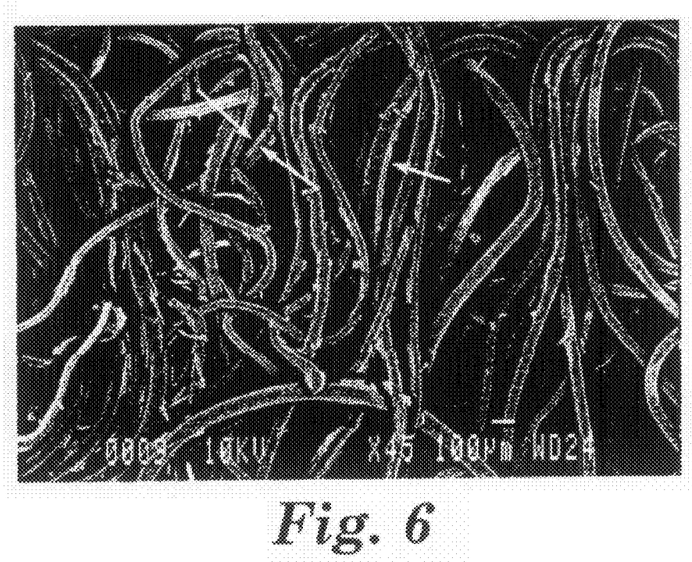
FIG. 6 is a scanning electron micrograph of a typical portion of a fibrous surface of an adhesive article made according to U.S. Pat. No. 6,129,964 (Seth).

In contrast, U.S. Pat. No. 6,129,964 (Seth) discloses the use of fibrous material having fibers with a denier of 15 and above. And, when using fibrous material that includes fibers with a denier of 9, the resultant product had less than optimal performance with respect to 180° peel (i.e., it had more than "moderate" fiber delamination). Furthermore, as shown in FIG. 6 (and Comparative Example C3), using the backing of U.S. Pat. No. 6,129,964 (Seth), a major amount of a solvent-borne low adhesion backsize does not remain on top of the fibrous surface, i.e., it penetrates into the fibrous material and is generally ineffective as a release material.

For certain embodiments, particularly useful backing materials for diaper tapes have a tensile strength in the machine or cross direction of at least about 8 Newtons per centimeter (N/cm), and a Elmendorf Tear strength in the machine or cross direction of at least about 50 grams/ply.

Pressure sensitive adhesives can be any of a variety of materials known and are generally applied to a backing material. Generally, pressure sensitive adhesives are used in tapes wherein a tape includes a backing (or substrate) and a pressure sensitive adhesive. A pressure sensitive adhesive adheres with no more than applied finger pressure and can be permanently tacky. Pressure sensitive adhesives can be used with primers, tackifiers, plasticizers, and the like. The pressure sensitive adhesives are preferably sufficiently tacky in their normal dry state, and have a desired balance of adhesion, cohesion, stretchiness, elasticity and strength for their intended use.

A release coating of the present invention provides an effective release for a wide variety of conventional pressure-sensitive adhesives such as natural rubber-based, acrylic, tackified block copolymer, and other synthetic film-forming elastomeric materials. Preferably, the pressure sensitive adhesive is nonacidic. That is, it does not include acidic components and is not prepared from acidic monomers such as acidic acrylates, although acrylamide monomers can be used if desired. Particularly preferred pressure sensitive adhesives are block copolymers such as those used in diaper tapes (i.e., diaper fastening tabs). Examples of such adhesives are described in U.S. Pat. No. 5,019,071 (Bany et al.), U.S. Pat. No. 5,453,319 (Gobran), and U.S. Pat. No. 5,468,237 (Miller et al.).

The present invention is illustrated by the following examples. It is to be understood that the particular examples, materials, amounts, and procedures are to be interpreted broadly in accordance with the scope and spirit of the invention as set forth herein. Unless otherwise indicated, all parts and percentages are by weight and all molecular weights are number average (Mn) molecular weight.

TEST METHODS

Unwind Force

This test measures the force required to unwind a roll of pressure sensitive adhesive tape. The unwind force values were determined according to a variation of ASTM D 3811. The tape samples were aged in a constant temperature and humidity room for 24 hours at 21° C. (70° F.) and 50% relative humidity. Three revolutions of tape were removed from a free turning roll, and the roll of tape was centered on the spindle of an unwind apparatus designed to replace the lower jaw on an Instron Tester (available from Instron Corporation). The free end of the tape was folded over to form a tab, and the tab was clamped in the upper jaw of the Instron Tester. Approximately 15.2 cm (6 inches) of tape was unwound at a rate of 50.8 cm/min (20 inches/minute), and the average peel value was recorded. Unwind force was also measured on tapes that had been heat aged for 15 days at 49° C. in a forced air convection oven to simulate long term natural aging. The results are reported in grams/2.54 cm-width, and represent the average of three independent measurements.

Fiber Delamination

During the above described heat aged unwind test a visual determination was made as to the level of fiber delamination or fiber pickoff observed when one layer of tape peeled away from an underlying adjacent layer. The observation was recorded as a 'Yes' if there was a high degree of delamination with significant decrease in readhesion, 'Moderate' if there was a significant amount of delamination with some decrease in readhesion, 'Slight' if there was a minor amount of fiber delamination with very little to no decrease in readhesion, and 'No' if there was no visible fiber delamination with no decrease in readhesion.

90 Degree Peel Readhesion

This test measures the degree of fiber contamination on the adhesive side resulting from any delamination or fiber picking from the nonwoven layer occurring when one layer of tape is removed from another layer of the same tape. A piece of smooth polyethylene film 330 microns thick was securely adhered to a steel panel measuring 5.1 cm wide by 12.7 cm long using double-coated adhesive tape. The 15.2 cm piece of tape that was unwound during the above described Unwind Force test, was centrally placed, adhesive side down on the surface of the polyethylene film and the tape was rolled down with two passes of a 2 kg rubber roller. The panel was placed into a fixture that was then placed into the bottom jaw of an Instron constant rate tensile tester while the non-adhered end of the tape was held by the upper jaw. The upper jaw was set in motion at a constant crosshead speed of 30.5 cm per minute while the steel panel was moved so as to keep the tape at a 90-degree angle to the panel. The tests were carried out at a constant temperature of 21° C. and 50 percent relative humidity. The force required to remove the contaminated tape from the polyethylene film was recorded as the readhesion value.

Tapes that exhibited high fiber delamination have low readhesion values due to contamination of the adhesive layer by the fibers that were picked off when peeling one layer away from an adjacent layer. Readhesion force was also measured on tapes that had been heat aged for 15 days at 49° C. in a forced air convection oven to simulate long term natural aging. The readhesion data in the Tables are reported in grams/2.54 cm-width. The results represent an average of at least two independent measurements.

Coating Weight

The coating weight of the release coating was measured with a x-ray fluorescent machine (Oxford 3000, Oxford Inc., Abingdon, England) and is reported in grams/meter$^2$.

Viscosity

The viscosities of some of the release material solutions were measured at room temperature using a Brookfield Viscometer equipped with a number 1 LV spindle operating at 60 revolutions per minute (rpm).

EXAMPLES

Example 1

Figure 3:
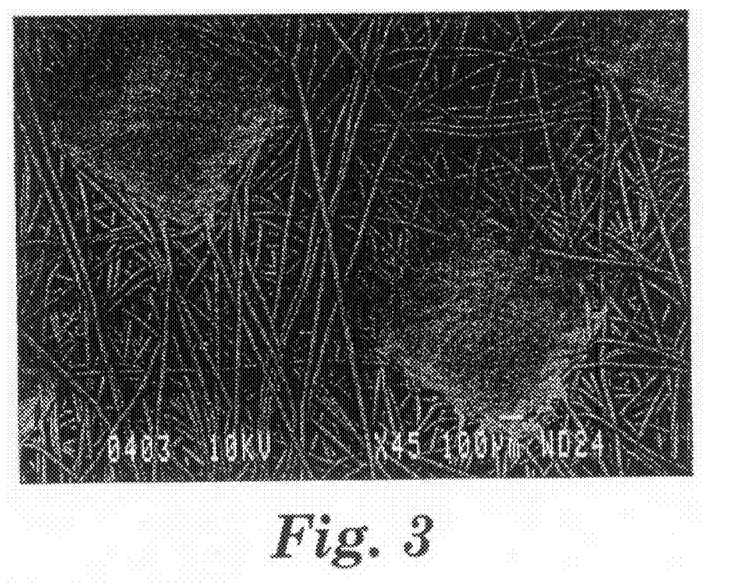
FIG. 3 is a scanning electron micrograph of a typical portion of a fibrous surface of a backing prior to application of a release coating according to the present invention.

Nonwoven fastening tapes were prepared by extrusion coating a polypropylene/polyethylene blend onto a point-bonded spunbond nonwoven web (50 grams/meter$^2$, 2 denier fibers, 19% bond area) to provide a nonwoven/film laminate backing. The basis weight of the film layer was 28 grams/meter$^2$. A typical fibrous surface of the backing is shown in FIG. 3. The nonwoven web side of the backing was corona treated to have a surface energy of about 33 dynes/cm and was then coated with a water-based release material. The release material was prepared at ambient room temperature (approximately 21° C.) using the following procedure: 15 parts by weight isophorone diisocyanate (IPDI, Bayer Chemicals Pittsburgh, Pa.), 340 parts by weight isopropanol, and 40 parts by weight tert-butyl acetate were added to a nitrogen purged reaction vessel. 14.7 parts by weight JEFFAMINE ED600 (Huntsman Performance Chemicals Houston, Tex.), 64.2 parts by weight silicone diamine (5200 Mn, prepared as in U.S. Pat. No. 5,512,650, Example 38)) and 20 parts by weight isopropanol were added to the resulting solution. The mixture was allowed to react for 10 minutes after which an aqueous solution of 200 parts by weight water, 6.02 parts by weight lysine hydrochloride and 7.1 parts by weight triethylamine was added over a period of 6 minutes. One hundred parts by weight of water was then added. The mixture was allowed to react for 30 minutes after which 537 parts by weight of liquid was distilled from the solution followed by addition of 70 parts by weight water to yield a 30% solids aqueous dispersion.

The release material was diluted with water to 10% solids and then gravure coated onto the nonwoven side of the backing using a QCH—Quad Channel gravure roll (Consolidated Engravers Inc. Charlotte, N.C.) acting against a rubber roll. The nip between the two rolls was gapped at 25-75 microns depending upon the thickness of the backing being coated. The coated web was then passed once through a forced air oven operating at 60° C. to 70° C. to dry the water from the release coating dispersion. The dry coating weight of the resulting release material was 0.87 grams/meter$^2$.

A pressure-sensitive adhesive was then hot melt coated onto the film side of the backing. The adhesive consisted of a blend of 49.5% styrene-isoprene-styrene block copolymer (KRATON 1119, Kraton Polymers Inc. Houston, Tex.), 49.5% hydrocarbon resin (WINGTACK PLUS, Goodyear Chemicals Inc. Akron, Ohio) and 1% IRGANOX 1076 antioxidant (Ciba Specialty Chemicals Tarrytown, N.Y.). The adhesive was coated onto the backing using a contact die and a melt temperature of approximately 180° C. The adhesive coating thickness was approximately 38 grams/meter$^2$. The resulting nonwoven fastening tape was then wound upon itself into roll form using as low a winding tension as possible to result in a stable roll.

Example 2

Figure 4:
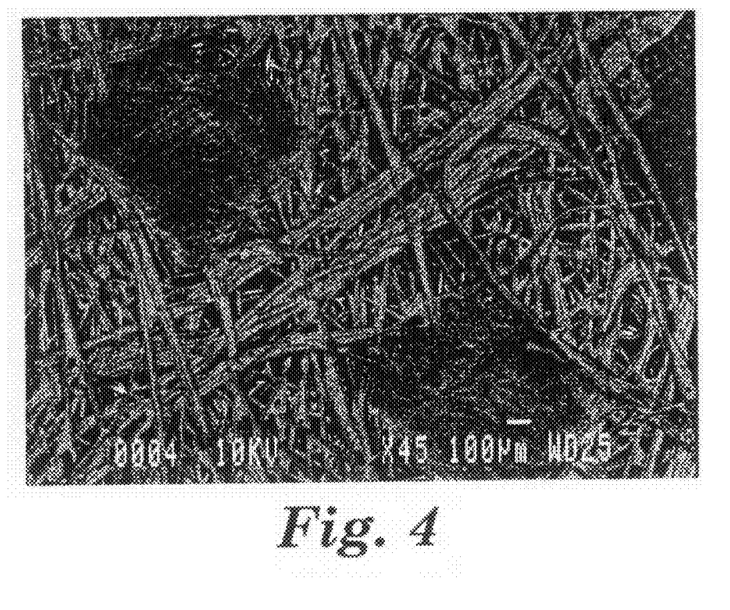
FIG. 4 is a scanning electron micrograph of a typical portion of a fibrous surface of an adhesive article made according to the present invention as described in Example 2.

A nonwoven fastening tape was prepared as in Example 1 except the dry coating weight of the release material was 1.40 grams/meter. A typical fibrous surface is shown in FIG. 4, which demonstrates that the release composition is substantially on the top of the fibrous surface as denoted by the light areas covering the fibers.

Example 3

Figure 5:
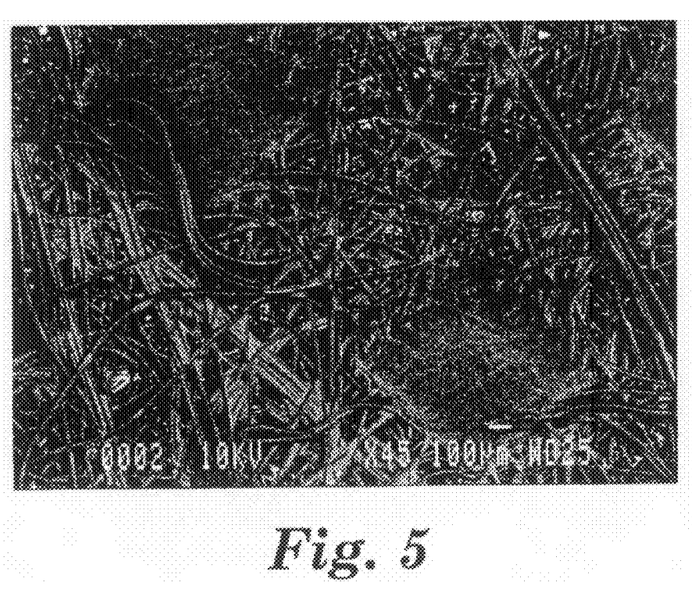
FIG. 5 is a scanning electron micrograph of a typical portion of a fibrous surface of an adhesive article made according to the present invention as described in Example 3.

A nonwoven fastening tape was prepared as in Example 1 except the release material was prepared as follows and coated out of isopropanol as a solvent. A solution of 11.85 parts by weight 5,000 Mn polydimethylsiloxane diamine (PDMS, prepared as in U.S. Pat. No. 5,512,650, Example 38), 0.15 parts by weight JEFFAMINE D4000 (Huntsman Performance Chemicals Houston, Tex.), 0.79 parts by weight 1,3-diaminopentane (DYTEK EP, DuPont Nylon Intermediates and Specialities Orange, Tex.) and 85 parts by weight 2-propanol was prepared in a reaction vessel. 2.21 parts by weight isophorone diisocyanate (IPDI, Bayer Chemicals Pittsburgh, Pa.) was added to the reaction vessel with stirring and a slow nitrogen purge at 25° C. The mixture was stirred under nitrogen for 30 minutes at 25° C. The final product was a clear, homogeneous solution (at 15% solids in 2-propanol) of a segmented block polymer with a formulation of 79 weight % PDMS, 1 weight % JEFFAMINE D4000, 5.3 weight % DYTEK EP and 14.7 weight % IPDI. The dry coating weight of the release material was 1.35 grams/meter$^2$. When coated out of solvent-based solutions, higher coating weights may be needed than when using water-based solutions to avoid a high degree of fiber delamination. Even at higher coating weights, tapes made from solvent-based release materials may show some fiber delamination. A typical fibrous surface is shown in FIG. 5, which demonstrates that the release composition has penetrated further into the fibrous material and is not substantially on the top of the fibrous surface as denoted by the presence of less light area covering the fibers compared to FIG. 4.

Table 1 below shows that nonwoven tapes when coated with a water-based silicone-urea release material, exhibit no significant fiber delamination when being unwound, as compared to the same silicone-urea release material when coated out of isopropanol as a solvent.

TABLE 1

| Material | Release Coating | Coating Weight (gm/m$^2$) | Unwind Force (gm/2.5 cm) Initial | Unwind Force (gm/2.5 cm) Heat Aged | Readhesion (gm/2.5 cm) Initial | Readhesion (gm/2.5 cm) Heat Aged | Fiber Delamination |
|---|---|---|---|---|---|---|---|
| 1 | Water based | 0.87 | 46 | 75 | 914 | 887 | Slight |
| 2 | Water based | 1.40 | 23 | 36 | 890 | 852 | No |

TABLE 1-continued

| Material | Release Coating | Coating Weight (gm/m$^2$) | Unwind Force (gm/2.5 cm) Initial | Unwind Force (gm/2.5 cm) Heat Aged | Readhesion (gm/2.5 cm) Initial | Readhesion (gm/2.5 cm) Heat Aged | Fiber Delamination |
|---|---|---|---|---|---|---|---|
| 3 | Solvent based | 1.35 | 55 | 117 | 837 | 790 | Moderate |

Example 4

A nonwoven fastening tape was prepared as in Example 1.

Example 5

A nonwoven fastening tape was prepared as in Example 1 except 40 parts by weight of silicone diamine, 36 parts by weight of JEFFAMINE ED600, parts by weight isophorone diisocyanate and 1.5 parts by weight lysine were used to prepare the release material. The release material was diluted with water to 10% solids for coating.

Comparative Example C1

A nonwoven fastening tape was prepared as in Example 1 except the release material was prepared as described in U.S. Pat. No. 5,356,706, Example 1. The release copolymer material had a silicone content of 13%. The release material was diluted with water to 10% solids for coating.

Comparative Example C2

A nonwoven fastening tape was prepared as in Example 1 except the release material was prepared in a manner similar to that described in U.S. Pat. No. 5,032,460 Example 6. The release copolymer material had a silicone content of 21%. The release material was diluted with water to 10% solids for coating.

Comparative Example C3

A nonwoven web having fibers of 9 and 15 denier was laminated onto a polyethylene-polypropylene backsheet, as described in Examples 1 and 2 of U.S. Pat. No. 6,129,964 (Seth). A solvent-borne release material was applied to the fibrous surface as of the backing as described above in Example 3. The resultant fibrous surface is shown in FIG. 6, which demonstrates that the release composition has penetrated into the fibrous material and is not substantially on the top of the fibrous surface (the arrows point to the release material which is represented by the light areas on the fibers).

Example 6

A nonwoven fastening tape was prepared as in Example 3.
Table 2 below compares the invention water-based silicone polyurea release materials with other types of release materials when coated onto nonwoven tape backings. Nonwoven tapes when coated with a water-based silicone-urea release material, exhibited no significant fiber delamination when being unwound, as compared to other release materials when coated onto the same backing. The dry coating weight of the release materials in Table 2 was between 0.95 and 1.10 grams/meter$^2$.

TABLE 2

| Material | Release Coating | Unwind Force (gm/2.5 cm) Initial | Unwind Force (gm/2.5 cm) Heat Aged | Readhesion (gm/2.5 cm) Initial | Readhesion (gm/2.5 cm) Heat Aged | Fiber Delamination |
|---|---|---|---|---|---|---|
| 4 | Water based | 23 | 38 | 912 | 889 | No |
| 5 | Water based | 81 | 132 | 890 | 814 | Slight |
| C1 | Water based | 108 | 290 | 540 | 229 | Yes |
| C2 | Water based | 163 | 316 | 503 | 311 | Yes |
| 6 | Solvent based | 75 | 128 | 830 | 625 | Moderate |

Example 7

A nonwoven fastening tape was prepared as in Example 1.

Example 8

A nonwoven fastening tape was prepared as in Example 1 except a different backing was used for the tape substrate. The backing was prepared by extrusion laminating a 42 gram/meter pattern-bonded carded polypropylene nonwoven web (PGI Nonwovens Mooresville, N.C.) to a 50 micron PP/PE copolymer (7C50, Dow Chemical Inc. Midland, Mich.) film using a moisture-curable polyurethane adhesive.

Example 9

A nonwoven fastening tape was prepared as in Example 1 except a different backing was used for the tape substrate. The backing was prepared by laminating a 32 gram/meter$^2$, 28 course nylon knitted loop woven web (Bocollina, Sitip s.p.a. Industrie Tessili Bergamo, Italy) to a 25 micron LDPE film. using a moisture-curable polyurethane adhesive.

Example 10

A nonwoven fastening tape was prepared as in Example 1 except a different backing was used for the tape substrate. The backing was prepared by extrusion laminating a 30 gram/meter$^2$ hydroentangled spunlaced polyester (HEF 140-070, BBA Nonwovens Simpsonville, S.C.) nonwoven web to a 3 layer coextruded elastic film consisting of a 102 gram/meter$^2$ core of KRATON G1657 SEBS block copolymer (Kraton Polymers Inc. Houston, Tex.) pigmented white with 2% of AMPACET 110313 (Ampacet Corp. Mt. Vernon, N.Y.) TiO$_2$ concentrate, and 2 micron skin layers of 7C50 PP/PE impact copolymer The laminate was lightly bonded on the nonwoven side with machine stripes 1 mm wide at 4 stripes/cm.

Example 11

A nonwoven fastening tape was prepared as in Example 1 except a different backing was used for the tape substrate. The backing was prepared by extrusion laminating a 82 gram/meter$^2$, 9×28 courses/2.5 cm polyester knitted loop woven web (Style 858028, Milliken Fabrics Spartanburg, S.C.) to a 49 gram/meter$^2$ polypropylene film.

Table 3 below shows that the invention water-based silicone polyurea release materials can be coated onto a variety of porous nonwoven and woven backings without exhibiting significant fiber delamination. The coating weights of the release materials in Table 3 ranged from 1.2-1.36 gram/meter$^2$.

TABLE 3

| Material | Release Coating | Unwind Force (gm/2.5 cm) | | Readhesion (gm/2.5 cm) | | Fiber Delamination |
| --- | --- | --- | --- | --- | --- | --- |
| | | Initial | Heat Aged | Initial | Heat Aged | |
| 7 | Water based | 34 | 71 | 844 | 812 | No |
| 8 | Water based | 51 | 87 | 805 | 745 | No |
| 9 | Water based | 31 | 46 | 708 | 677 | No |
| 10 | Water based | 19 | 31 | 886 | 771 | No |
| 11 | Water based | 22 | 40 | 764 | 809 | No |

Example 12

A nonwoven fastening tape was prepared as in Example 1.

Example 13

A nonwoven fastening tape was prepared as in Example 12 except 2% Acrysol 6038A polyacrylate (Rohm & Haas Pittsburgh, Pa.) was added to increase the viscosity of the water-based release material solution. The release material was diluted with water to 10% solids for coating.

Example 14

A nonwoven fastening tape was prepared as in Example 12 except 3% ACRYSOL 6038A polyacrylate was added to increase the viscosity of the water-based release material solution. The release material was diluted with water to 10% solids for coating.

Example 15

A nonwoven fastening tape was prepared as in Example 12 except 4% ACRYSOL 6038A polyacrylate was added to increase the viscosity of the water-based release material solution. The release material was diluted with water to 10% solids for coating.

Example 16

A nonwoven fastening tape was prepared as in Example 3.

Example 17

A nonwoven fastening tape was prepared as in Example 16 except 100 ppm polyacrylic acid (450,000 Mw (weight average), Sigma-Aldrich Chemical St. Louis, Mo.) was added to increase the viscosity of the solvent-based release material solution. The release material was diluted with isopropanol to 10% solids for coating.

Example 18

A nonwoven fastening tape was prepared as in Example 16 except 180 ppm polyacrylic acid (450,000 Mw, Sigma-Aldrich Chemical St. Louis, Mo.) was added to increase the viscosity of the solvent-based release material solution. The release material was diluted with isopropanol to 10% solids for coating.

Example 19

A nonwoven fastening tape was prepared as in Example 16 except 300 ppm polyacrylic acid (450,000 Mw, Sigma-Aldrich Chemical St. Louis, Mo.) was added to increase the viscosity of the solvent-based release material solution. The release material was diluted with isopropanol to 10% solids for coating.

Table 4 below shows that the viscosities of the invention release material solutions can be varied widely with the use of thickeners to accommodate a wide variety of porous backings. The coating weights of the release materials in Table 4 ranged from 0.93-1.05 gram/meter$^2$.

TABLE 4

| Material | Release Coating | Viscosity (centipoise) | Unwind Force (gm/2.5 cm) | | Readhesion (gm/2.5 cm) | | Fiber Delamination |
| --- | --- | --- | --- | --- | --- | --- | --- |
| | | | Initial | Heat Aged | Initial | Heat Aged | |
| 12 | Water based | 7 | 41 | 78 | 814 | 763 | No |
| 13 | Water based | 70 | 28 | 38 | 818 | 791 | No |
| 14 | Water based | 140 | 24 | 39 | 841 | 804 | No |
| 15 | Water based | 236 | 49 | 90 | 743 | 712 | No |
| 16 | Solvent based | 20 | 89 | 119 | 749 | 705 | Moderate |
| 17 | Solvent based | 90 | 77 | 105 | 779 | 716 | Slight |
| 18 | Solvent based | 200 | 84 | 120 | 792 | 720 | Moderate |
| 19 | Solvent based | 400 | 130 | 182 | 740 | 678 | Moderate |

Examples 20-25 were prepared to demonstrate that the invention release material can be used with a wide variety of pressure-sensitive adhesives.

Example 20

A nonwoven fastening tape was prepared as in water-based Example 1.

Example 21

A nonwoven fastening tape was prepared as in water-based Example 1 except a less aggressive adhesive (medium tack) was coated onto the film side of the backing. The adhesive consisted of a blend of 49.5% styrene-isoprene-styrene block copolymer (KRATON 1107, Kraton Polymers Inc. Houston, Tex.), 49.5% hydrocarbon resin (WINGTACK Plus, Goodyear Chemicals Inc. Akron, Ohio) and 1% IRGANOX 1076 antioxidant (Ciba Specialty Chemicals Tarrytown, N.Y.). The adhesive was coated onto the backing using a contact die and a melt temperature of approximately 180° C. The adhesive coating thickness was approximately 38 grams/meter$^2$. The resulting nonwoven fastening tape was then wound upon itself into roll form using as low a winding tension as possible to result in a stable roll.

Example 22

A nonwoven fastening tape was prepared as in water-based Example 21 except a less aggressive adhesive (low tack) was coated onto the film side of the backing. The adhesive consisted of a blend of 44.5% styrene-isoprene-styrene block copolymer (KRATON 1107, Kraton Polymers Inc. Houston, Tex.), 44.5% hydrocarbon resin (WINGTACK PLUS, Goodyear Chemicals Inc. Akron, Ohio), 10% ZONAREZ A-25 tackifier (Arizona Chemical Jacksonville, Fla.) and 1% IRGANOX 1076 antioxidant (Ciba Specialty Chemicals Tarrytown, N.Y.). The adhesive was coated onto the backing using a contact die and a melt temperature of approximately 180° C. The adhesive coating thickness was approximately 38 grams/meter$^2$. The resulting nonwoven fastening tape was then wound upon itself into roll form using as low a winding tension as possible to result in a stable roll.

Example 23

A nonwoven fastening tape was prepared as in solvent-based Example 3 (high tack adhesive).

Example 24

A nonwoven fastening tape was prepared as in solvent-based Example 3 except the adhesive (medium tack adhesive) described in Example 21 was used.

Example 25

A nonwoven fastening tape was prepared as in solvent-based Example 3 except the adhesive (low tack adhesive) described in Example 22 was used.

TABLE 5

| Material | Adhesive | Coating Weight (grams/m$^2$) | Readhesion (gm/2.5 cm) Initial | Readhesion (gm/2.5 cm) Heat Aged | Fiber Delamination |
|---|---|---|---|---|---|
| 20 | High tack | 1.03 | 960 | 844 | No |
| 21 | Med tack | 1.21 | 821 | 800 | No |
| 22 | Low tack | 1.11 | 690 | 635 | No |
| 23 | High tack | 1.02 | 709 | 614 | Mod |
| 24 | Med tack | 1.05 | 790 | 622 | Mod |
| 25 | Low tack | 1.02 | 616 | 592 | Slight |

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. An article comprising:
   a porous substrate comprising a fibrous material, wherein the fibrous material comprises fibers with at least 90% of the fibers having a denier of less than 9; and
   a release coating disposed on the fibrous material of the porous substrate;
   wherein the release coating comprises a thermoplastic silicone-containing polymer comprising at least about 30% silicone segments.

2. A diaper comprising a diaper tape comprising:
   a backing comprising a polymeric film and a fibrous layer disposed thereon, wherein the fibrous layer comprises fibers wherein at least 90% of the fibers have a denier of less than 9;
   a pressure sensitive adhesive disposed on the polymeric film of the backing; and
   a low adhesion backsize disposed on the fibrous layer of the backing;
   wherein the low adhesion backsize comprises a thermoplastic silicone-containing polymer comprising at least about 30% silicone segments.

3. The diaper of claim 2 wherein the bond strength between the polymeric film and the fibrous layer is greater than the bond strength between the low adhesion backsize and the pressure sensitive adhesive of an overlying tape.

4. The diaper of claim 3 wherein at least 90% of the fibers of the fibrous layer have a denier of 5 or less.

5. The diaper of claim 2 wherein the low adhesion backsize is disposed on the fibrous layer of the backing at a coating weight of no greater than 2.0 g/m$^2$.

6. The diaper of claim 2 wherein the thermoplastic silicone-containing polymer comprises a silicone polyurea.

7. The diaper of claim 2 wherein a major amount of the low adhesion backsize is disposed on top of the fibrous layer.

8. The diaper of claim 7 wherein the low adhesion backsize is penetrated into no more than the top 20% of the fibrous layer.

9. The diaper of claim 2 wherein the thermoplastic silicone-containing polymer comprises the following repeating unit:

where:
Z is a divalent radical selected from phenylene, alkylene, aralkylene and cycloalkylene;
Y is an alkylene radical of 1 to 10 carbon atoms;
R is at least 50% methyl with the balance of the 100% of all R radicals being selected from a monovalent alkyl radical having from 2 to 12 carbon atoms, a substituted alkyl radical having from 2 to 12 carbon atoms, a vinyl radical, a phenyl radical, and a substituted phenyl radical;
D is selected from hydrogen, an alkyl radical of 1 to 10 carbon atoms, and phenyl;
B is selected from alkylene, aralkylene, cycloalkylene, phenylene, polyethylene oxide, polypropylene oxide, polytetramethylene oxide, polyethylene adipate, polycaprolactone, polybutadiene, mixtures thereof, and a radical which completes a ring structure including A to form a heterocycle, and optionally contains a sufficient number of in-chain or pendant ammonium ions or pendant carboxylate ions to render the block copolymer water-dispersible;

A is selected from the group consisting of —O—, and where G is selected from the group consisting of hydrogen, an alkyl radical of 1 to 10 carbon atoms, a phenyl group, and a radical which completes a ring structure including B to form a heterocycle;

"n" is a number which is 10 or larger; and

"m" is a number, other than zero, of up to 25.

10. The diaper of claim 2 wherein the pressure sensitive adhesive is a nonacidic pressure sensitive adhesive.

11. The diaper of claim 2 wherein the fibrous layer comprises a hydrophobic material.

12. A diaper comprising a diaper tape comprising:
a porous substrate comprising a fibrous material, wherein the fibrous material comprises fibers with at least 90% of the fibers having a denier of less than 9; and
a release coating disposed on the fibrous material of the porous substrate;
wherein the release coating comprises a thermoplastic silicone-containing polymer comprising at least about 30% silicone segments and 1-5% carboxylic acid moieties; and
wherein the release coating is penetrated into no more than the top 20% of the fibrous material.

13. The diaper of claim 12 wherein 90% of the fibers of the fibrous material have a denier of 5 or less.

14. The diaper of claim 13 wherein a major amount of the low adhesion backsize is disposed on top of the fibrous layer.

15. A diaper comprising a diaper tape comprising:
a backing comprising a polymeric film and a fibrous layer disposed thereon, wherein the fibrous layer comprises fibers wherein at least 90% of the fibers have a denier of less than 9;
a pressure sensitive adhesive disposed on the polymeric film of the backing; and
a low adhesion backsize disposed on the fibrous layer of the backing;
wherein the low adhesion backsize comprises a thermoplastic silicone-containing polymer comprising at least about 30% silicone segments and 1-5% carboxylic acid moieties; and
wherein the low adhesion backsize is penetrated into no more than the top 20% of the fibrous layer.

16. The diaper of claim 15 wherein the bond strength between the polymeric film and the fibrous layer is greater than the bond strength between the low adhesion backsize and the pressure sensitive adhesive of an overlying tape.

17. The diaper of claim 15 wherein the thermoplastic silicone-containing polymer comprises a silicone polyurea.

18. The diaper of claim 15 wherein the low adhesion backsize is disposed on the fibrous layer of the backing at a coating weight of no greater than 2.0 g/m$^2$.

19. The diaper of claim 15 wherein the low adhesion backsize is coated out of water.

20. The diaper of claim 15 wherein at least 90% of the fibers of the fibrous layer have a denier of 5 or less.

21. The diaper of claim 15 wherein a major amount of the low adhesion backsize is disposed on top of the fibrous layer.

22. An article comprising:
a backing comprising a polymeric film and a fibrous layer disposed thereon, wherein the fibrous layer comprises fibers wherein at least 90% of the fibers have a denier of less than 9;
a pressure sensitive adhesive disposed on the polymeric film of the backing; and
a low adhesion backsize disposed on the fibrous layer of the backing;
wherein the low adhesion backsize comprises a thermoplastic silicone-containing polymer comprising at least about 30% silicone segments.

23. The article of claim 22 wherein the bond strength between the polymeric film and the fibrous layer is greater than the bond strength between the low adhesion backsize and the pressure sensitive adhesive of an overlying tape.

24. The article of claim 22 wherein the low adhesion backsize is coated out of water.

25. The article of claim 22 wherein the low adhesion backsize is penetrated into no more than the top 20% of the fibrous layer.

26. A method of making an article according to claim 1, the method comprising:
providing a porous substrate comprising a fibrous material, wherein the fibrous material comprises fibers with at least 90% of the fibers have a denier of less than 9; and
applying an aqueous dispersion comprising a thermoplastic silicone-containing polymer to a surface of the porous substrate to form a release coating disposed on the fibrous material of the porous substrate;
wherein the thermoplastic silicone-containing polymer comprises at least about 30% silicone segments.

27. The method of claim 26 wherein the fibrous material comprises hydrophobic fibers.

28. The method of claim 26 wherein the release coating is penetrated into no more than the top 20% of the fibrous material.

29. A method of making the article according to claim 22, the method comprising:
providing a porous backing having a polymeric film as a first major surface and fibrous layer as a second major surface, wherein the fibrous layer comprises fibers wherein at least 90% of the fibers have a denier of less than 9;
applying a pressure sensitive adhesive to the first major surface of the porous backing; and
applying an aqueous dispersion comprising a thermoplastic silicone-containing polymer to the second major surface of the porous backing to form a low adhesion backsize;
wherein the thermoplastic silicone-containing polymer comprises at least about 30% silicone segments.

30. The method of claim 29 wherein the fibrous layer is hydrophobic.

31. The method of claim 29 wherein the low adhesion backsize is penetrated into no more than the top 20% of the second major surface of the porous backing.

32. The method of claim 29 wherein the fibrous layer comprises fibers with at least 90% of the fibers having a denier of 5 or less.

33. The method of claim 29 wherein the low adhesion backsize is disposed on the backing at a coating weight of no greater than 2.0 g/m².

34. The method of claim 29 wherein the thermoplastic silicone-containing polymer comprises a silicone polyurea.

35. The method of claim 29, wherein the thermoplastic silicone-containing polymer comprises 1-5% carboxylic acid moieties.

36. The method of claim 29 wherein a major amount of the low adhesion backsize is disposed on top of the second major surface of the porous backing.

\* \* \* \* \*

UNITED STATES PATENT AND TRADEMARK OFFICE
CERTIFICATE OF CORRECTION

| | | |
|---|---|---|
| PATENT NO. | : 7,737,057 B2 | |
| APPLICATION NO. | : 11/981190 | |
| DATED | : June 15, 2010 | |
| INVENTOR(S) | : Stephen William Bany | |

It is certified that error appears in the above-identified patent and that said Letters Patent is hereby corrected as shown below:

Column 12
Line 15 (approx.), delete "grams/meter." and insert in place thereof -- grams/meter$^2$. --.

Column 13
Line 20 (approx.), delete "parts" and insert in place thereof -- 25 parts --.

Column 14
Lines 23-24, delete "gram/meter" and insert in place thereof -- gram/meter$^2$ --.

Column 19
Line 33 (approx.), in Claim 13, after "wherein" insert -- at least --.

Signed and Sealed this
Tenth Day of May, 2011

David J. Kappos
*Director of the United States Patent and Trademark Office*